Patented May 29, 1951

2,555,255

UNITED STATES PATENT OFFICE 2,555,255

METHOD OF RECOVERING TERPENE POLYMERS FROM SOLUTION

Edward W. Suhanin, Pittsburgh, Pa., assignor to Pennsylvania Industrial Chemical Corporation, Clairton, Pa., a corporation of Pennsylvania No Drawing. Application September 2, 1949,
Serial No. 113,896

2 Claims. (Cl. 260—93.3)

This invention relates to a dehalogenation method of recovering clean, light colored terpene resins from the solutions in which the resin polymers are formed.

In the resin-forming polymerization of various of the terpenes, such as beta-pinene, dl-limonene, alpha-pinene, the various mixtures of such terpenes with each other and with other terpenes such as camphene, terpinene and terpinolene, polymerization is in usual practice performed under the stimulus of a metal halide of the acid-reacting, Friedel-Crafts type typically aluminum chloride. Disadvantageous results are caused by retention of residual chlorine in the solution of polymers resulting from the polymerizing reaction. This residual chlorine has a corrosive effect on the metal equipment in which the resin solution is subjected to distillation for the recovery of solid resin; this corrosive effect results in darkening the resin and in the inclusion of dark specks in the resin. These results by detracting substantially from the utility of the product resin, present a serious disadvantage.

In the resin-forming polymerization of terpene aluminum chloride is the greatly preferred catalyst, because it tends to give clear resins of light color, apart from the contamination of which reference has been made. Comparative tests were made on samples of beta-pinene polymer solution polymerized with aluminum chloride, in which the samples were distilled respectively in an iron vessel and in a glass vessel and then were checked for chlorine by the Beilstein copper wire test. These tests showed that the distillation in metal equipment reduced the chlorine content of the resin. In commercial practice it is this dechlorinating effect of iron stills and condensers, which causes darkening and specks in what would otherwise be a clear and light colored resin.

It is a fact that the generally practiced steps of neutralization and washing and also purification by clay-filtering are ineffective to free the resin solution of chlorine. I have discovered that by heating moderately a solution of the terpene polymers formed in a reaction stimulated by anhydrous aluminum chloride with zinc in metallic state and with fuller's earth, I am able to provide for distillation an effectively halogen-free solution of terpene polymers, which yields on distillation a clear resin which is of good color and free from specks. The dehalogenation is performed as a step in the resin recovery after the solution has been washed and prior to distillation for the recovery of solid resin. The dehalogenation is performed either under reflux with fuller's earth in suspension and with the solution repeatedly subjected to contact with the metallic zinc, or under other conditions which subject the polymer simultaneously to contact with the zinc and with the fuller's earth. It should be noted that the presence of the zinc while heating the polymer solution protects the metal of an iron still or other metal container from substantial deterioration during dehalogenation and that contact of the polymer solution with the fuller's earth during zinc treatment protects the resin polymers from the severe darkening effect attendant on contact with the zinc.

To exemplify the dehalogenation procedure as performed on the polymerization product of a commercial grade of beta-pinene the following is given:

EXAMPLE 1

The polymerization product subjected to dechlorination was the result of a plant operation in which the terpene starting material was an approximately 85% pure commercial grade of beta-pinene distilling at a vapor temperature within the range of 159° C. to 166° C. It had an A. S. T. M. D611–46T mixed aniline point close to 37° C. For polymerization, 1200 gallons of this beta-pinene was blended with 1400 gallons of Stoddard solvent distilling at a vapor temperature within the range of 140° C. to 164° C. It had an A. S. T. M. straight aniline point close to 63° C. This dilute beta-pinene was agitated with 190 lbs. of a commercial grade of anhydrous aluminum chloride at a temperature within the approximate range of 35° C. to 45° C. After polymerization the solution of resin polymers in the petroleum solvent was drowned with 4% sulphuric acid and was washed twice with water.

Samples of several runs were taken, each sample consisting of 400 grams of the resin solution, taken after acid drowning and water washing but before dechlorination. Each of the samples was distilled in glass to 240° C. and was steam distilled for one-half hour. The system during distillation was closed; the distillate was collected over sodium hydroxide solution and the non-condensable gases were scrubbed through sodium hydroxide solution. The distillate from run No. 1 showed an acidity of 18.1 cc. of N/10 NaOH per each 100 grams of resin recovered by distillation. The resin was positive to the presence of chlorine by the Beilstein copper wire test. The distillate from run No. 2 showed an acidity of 29.5 cc. of N/10 NaOH per 100 grams of resin recovered by distillation. The resin was positive to the presence of chlorine by the Beilstein copper wire test.

Taking a similar 500 gram sample consisting of a mixture of resin solution from the runs noted above, the sample was placed in a 2 liter three-neck glass flask with 5 grams of zinc dust (about 99% pure metallic) and 15 grams of fuller's earth of the weakly acid sort having a pH between 5 and 7 when agitated with an equal weight of water and checked with Cargille paper. The resin solution was refluxed at an initial temperature of 165° C. with mechanical agitation in a closed system. Live steam was introduced and reflux was continued for about 3 hours. The solution then was filtered.

Both the non-condensable gases formed during the refluxing and the condensate from the steam were collected. The non-condensable gases showed an acidity of 265 cc. of N/10 NaOH and the condensate from the steam showed an acidity of 265 cc. of N/10 NaOH.

The filtered solution was distilled to 240° C. and steam-distilled at a temperature between 245° C. and 250° C. for one-half hour. The solid resin which was recovered has a softening point (ball and ring) of 86° C. and a color G–4.

The total acidity of the distillate was 2.0 cc. of N/10 NaOH.

The resin was negative to the Beilstein copper wire test for the presence of chlorine.

EXAMPLE 2

A series of runs was made on several samples which comprised mixtures of plant polymerizations of beta-pinene which had been acid-drowned and water washed. The mixed samples of resin solution responded closely in acidity and chlorine contamination to the samples checked and dechlorinated in Example 1. The apparatus and procedure were similar to those used in Example 1. In this example, however, a series of comparative runs were made to determine what conditions are necessary or most desirable for the dehalogenation treatment. Data relative to several runs to effect dechlorination of samples of the resin solution and the results from subsequent distillation are given in Tables 1 and 2 as follows:

*Table 1.—Dechlorination data*

| | Weight of Sample | Amount and kind of Zinc | Fuller's Earth | Live steam during refluxing | Reaction Temp. | Acidity of the non-condensable gases, in cc. of N/10 NaOH | Acidity of the condensed steam and trap Contents, cc. of N/10 NaOH | Beilstein Chlorine Test |
|---|---|---|---|---|---|---|---|---|
| | *Grams* | | | | °C. | Cc. | Cc. | |
| a | 800 | 8 g.–dust | 24 g. clay+8 g. lime. | Yes | 160–162 | 108 | 106 | Negative. |
| b | 800 | 8 g.–dust | 15 g. | Yes | 160–162 | 24 | 327 | Do. |
| c | 500 | 5 g.–dust | 15 g. | No | 168 | 311 | 122 | Do. |
| d | 500 | 50 g.–mossy | 15 g. | Yes | 164–166 | 450 | 632 | Do. |
| e | 500 | 50 g.–mossy | 15 g. | No | 175 | 874 | 130 | Do. |
| f | 1,000 | 50 g.–mossy | 30 g. | No | 175–177 | 1,848 | 86 | Do. |

*Table 2.—Distillation data*

| | Distillation Vessel | Weight of Sample Distilled | S. P. of Resin | Total acidity of the distillate, cc. of N/10 NaOH | Beilstein Chlorine Test |
|---|---|---|---|---|---|
| | | *Grams* | °C. | Cc. | |
| a | iron | 800 | 87 | 20 | Negative. |
| b | do | 800 | 77 | 18 | Do. |
| c | glass | 500 | 90 | 1 | Do. |
| d | do | 500 | 83 | 3 | Do. |
| e | do | 500 | 78 | 7 | Do. |
| f | do | 500 | 96 | 14 | Do. |

With respect to Table 1, it should be explained that in each run refluxing was continued for a period of 3 hours. Where it is stated that live steam was not used during the refluxing, it was passed through the resin solution for about 10 to 15 minutes immediately after reflux to carry off vaporized acid. In runs a and b there was a vigorous reaction at the beginning of reflux with an evolution of gas which carried liquid over into the condenser and water trap. It will be noted that in both those runs the resin solution in relatively large volume was refluxed with zinc dust, the distribution of the zinc dust through the resin solution tending to cause vigorous initial action. In using the mossy zinc, the zinc was simply permitted to lie in the bottom of the vessel and the resin solution was agitated mechanically around and through it. In each instance in which mossy zinc was used the reaction from the beginning of the reflux proceeded smoothly. Lime was used in run a and it is apparent that the addition of lime to the zinc and fuller's earth did little or nothing to increase the effectiveness of the treatment. It is also apparent that the employment of live steam during the refluxing is not necessary, provided the acid vapors be adequately removed. In each run the treated resin solution was filtered and the filtrate was subjected to the Beilstein copper wire test, the indication in all instances being negative. In all instances, the color of the solution after filtration was as good or better than before treatment. Another run (not tabulated) was made under conditions identical with those of run c, save that the fuller's earth was omitted during reflux and the solution then was filtered through a bed of fuller's earth. That run gave a dark amber filtrate much darker than those of the tabulated runs.

Table 2 gives the distillation data on the filtrates from the dechlorinated resin solutions of Table 1, the distillation runs being designated correspondingly with the dechlorination runs of that first table. With respect to Table 2, it will be seen that all substantial chlorine contamination had been eliminated by the dechlorination and that the acidity of the resin solutions had been reduced to a minimum. The resins obtained after distillation were of as good or better color than those obtained from distillation of samples of the same blended polymer solution which had not been subjected to dechlorination. The resin from distillations a and b of dechlorinations runs a and b (Table 1), which distillate distilling from about 140° C. to 164° C. (vapor temperature). In using the aromatic solvent as diluent, a smoother more even reaction was obtained than the one in which the aliphatic solvent was used. The polymer solutions were in each run drowned with 4% sulphuric acid and were each given two water washes of 2 liters each. The polymerization of the beta-pinene and the properties of the polymer solutions thus obtained are given in Tables 3 and 4 as follows:

*Table 3.—Polymerization data*

| Run No. | Composition of Batch | Weight of AlCl₃ used, per cent by weight of Beta Pinene | Reaction Temp. | Time of add. of Catalyst | Agit. per. after add. of catalyst | Vol. of 4% H₂SO₄ used in drowning |
|---|---|---|---|---|---|---|
| | | | °C. | | Hours | Liters |
| a | 7,900 g. Beta-Pinene, 9,620 g. Solvesso 100. | 150 g.—1.9% | 40–45 | 1 hr., 36 min. | 2½ | 2 |
| b | 7,975 g. Beta-Pinene, 9,600 g. Solvesso 100. | 400 g.—5.0% | 40–45 | 2 hrs., 12 min. | 2¼ | 4½ |
| c | 7,950 g. Beta-Pinene, 9,600 g. Penn Drake Naphtha. | 400 g.—5.0% | 40–45 | 2 hrs. | 2 | 4½ |

*Table 4.—Distillation data*

| | Temp. of acid and water washing | Weight of Sample Distilled | Per Cent Yield, based on Weight of Beta-Pinene | S. P. of Resin | color | Total Acidity | Beilstein Chlorine Test |
|---|---|---|---|---|---|---|---|
| | °C. | Grams | Per cent | °C. | | Cc. | |
| a | 90–92 | 500 | 66.3 | 123 | G–4½ | 96 | Positive. |
| b | 85–88 | 500 | 94.5 | 111½ | G–5+ | 348 | Do. |
| c | 85–88 | 500 | 93.2 | 117 | G–4½ | 95 | Do. | tions were conducted in iron vessels, were free from dark spots, or specks.

The resins obtained by the distillation following dechlorination had ball and ring softening points 20° C. to 25° C. lower than the resins obtained from undechlorinated samples of the same blend of polymer solution. The weight of resin recovered by distillation was, however, 10% to 20% higher from the dechlorinated samples. By steam-distilling a portion of the resin obtained by dechlorination and distillation b for 40 minutes at a temperature of 240° C., a resin having a ball and ring softening point of 117° C. rather than 77° C. was obtained.

The foregoing examples relate to the dechlorination of samples taken from commercial scale polymerizations of beta-pinene. In the following example, Example 3, beta-pinene polymer solutions were made by laboratory polymerizations and in the dechlorination runs the apparatus used was closer to commercial apparatus in its form than the apparatus used in the dechlorination runs given above. Save for such variations as are noted in the tables, the apparatus and procedure in all the dechlorination runs was as follows:

EXAMPLE 3

In this example the beta-pinene used for the laboratory polymerizations was a good grade of commercial beta-pinene between 85% and 90% pure. The beta-pinene and the aluminum chloride used in runs b and c were identical, having been taken from the same place at the same time. The "Solvesso" used as diluent in runs a and b is an aromatic solvent obtained from the cracking of petroleum and which distills from about 154° C. to 170° C. (vapor temperature). The "Penn Drake Naphtha" is a petroleum naphtha representing a cut of aliphatic petroleum distil- For the dechlorination work on the laboratory polymerized beta-pinene solutions a steel vessel having a capacity of 3 liters was used in place of the three necked glass flask. Two pockets, for holding the mossy zinc, were made by welding iron screen to the inner side of the vessel; they were placed directly opposite each other. For any volume of material charged to the vessel, the combined volumes of the two pockets, at the level of the charged liquid was made equal to 10% the volume of the charge. On the side of the dechlorinator, near the bottom, there was inserted a valve for removing the charge. Through the head which was made removable, a live steam line was extended to the bottom of the vessel and a steam distributor was attached. Three holes were also cut into the head of the vessel—one for a thermometer, the second for the water trap-condenser set up, and the third for a mechanical stirrer.

Following is a general description of the procedure used in Tables 5 and 6 in effecting the dechlorination of the laboratory polymerized beta-pinene solutions of Tables 3 and 4. 150 g. of mossy zinc were charged into the two pockets of the dechlorinator—approximately half of the zinc going to one, the remainder to the other. The same zinc was used in all runs. After the last run the mossy zinc was removed and was found to be covered with a black coating. The zinc was washed twice with hot Hi-flash solvent, once with alcohol, twice with water, and finally with alcohol. The zinc was dried overnight in a 100° C. oven; the zinc then weighed 140.5 g., 9.5 g. having been used in the dechlorination runs. In appearance the washed zinc resembled the zinc originally charged.

The polymerized beta-pinene solution to be dechlorinated was charged to the reaction vessel with the fuller's earth. The system was closed and the solution was heated to a distilling temperature and was distilled with refluxing for 2¼ hours. During the refluxing, which was conducted in the absence of steam, mechanical stirring was used and the non-condensable gases from the reflux condenser were scrubbed through sodium hydroxide solution. At the end of refluxing, live steam was introduced for from 10 to 15 minutes to sweep out any acidic gases which might have remained in the reaction vessel. The mixture of the treated solution and fuller's earth was then removed from the reaction vessel and filtered.

The filtered, dechlorinated samples were distilled to 240° C., and steam-distilled between 245° C. to 250° C. for ½ hour. This distillation procedure was the same whether the distillation vessel was glass or iron.

The experiment numbers of Table 5 correspond exactly to the experiment numbers in Table 6. That is, the material distilled in run $a$, Table 6 is a sample that was dechlorinated in run $a$, Table 5. In the data given in Tables 5 and 6, the starting material for run $a$ is the product of run $a$ of Table 3, the starting material of runs $b$, $c$ and $d$ is the product of run $b$ of Table 3 and the starting material of run $e$ is the product of run $c$ of Table 3. Tables 5 and 6 follow:

high as 160° C. in order to effect substantially complete dehalogenation. It has also been found that 180° C. is the approximate upper temperature limit which it is practical to employ without excessive depolymerization.

The color of the resin recovered by distillation was in each run as good or better than the color of the resin when recovered from solutions treated solely with an equivalent amount of fuller's earth but which had not been subjected to zinc-treatment. Run $d$ was not refluxed with fuller's earth, but the solution both before and after dechlorination was filtered through a bed of the fuller's earth. It will be noted that the color of this resin is much darker than that of resin recovered from polymer solutions which were in contact with the clay during the reflux distillation. In each run the color of the resin recovered by distillation in iron differed almost imperceptibly from the color of the resin recovered from the sample distilled in glass. It appears that contact with clay during the zinc-treatment prevents a dark coloration of the resin polymers and that when such coloration has been acquired it cannot be removed adequately by later treatment.

In the two runs of Tables 7 and 8 which follow the polymer solution was not refluxed, but

*Table 5—Dechlorination data*

| | Weight of Sample | Fuller's earth | Reaction Temp. | Acidity of non-condensable gases, cc. of N/10 NaOH | Acidity of contents of water-trap, cc. of N/10 NaOH | Beilstein Chlorine test on resin solution |
|---|---|---|---|---|---|---|
| | | Grams | °C. | Cc. | Cc. | |
| a | 1,500 g | 45 | 171-173 | 870 | 478 | Negative. |
| b | 1,500 g | 45 | 172-174 | 190 | 522 | Do. |
| c | 1,200 g | 36 | 172-173 | 121 | 415 | Do. |
| d | 1,500 g | None | 172-173 | 652 | 257 | Do. |
| e | 1,000 g. poly'd oil +400 cc. Kerosene | 30 | 172-174 | 55 | 146 | Do. |

*Table 6—Distillation data*

| | Distillation Vessel | Weight of Sample Distilled | S. P. of Resin | Total Acidity of Distillate, cc. of N/10 NaOH | Color of Resin | Beilstein Chlorine test on resin solution |
|---|---|---|---|---|---|---|
| | | Grams | °C. | Cc. | | |
| a | Glass | 500 | 100 | 1.5 | G-4 | Negative. |
| | Iron | 795 | 95 | 6 | | Do. |
| b | Glass | 500 | 108½ | 2.5 | G-5 | Do. |
| | Iron | 707 | 113 | 7.5 | | Do. |
| c | Glass | 500 | 110 | 3 | 4 | Do. |
| | Iron | 637 | 109 | 68 | | Do. |
| d | Glass | 500 | 108 | 2 | 10 | Do. |
| | Iron | 768 | 112 | 45 | | Do. |
| e | Glass | 500 | 113 | 1 | | Do. |
| | Iron | 484 | 62 | 3 | | Do. |

In the runs of Table 5 reflux was employed in each instance. In run $e$ in which the diluent was petroleum naphtha, the distillation temperature was raised by the addition of kerosene in order to obtain an adequately high temperature of treatment during reflux. Adequately high temperature appears to be essential to satisfactory dehalogenation. Two runs were conducted identically with runs $a$ and $b$ of Table 5, save that the temperature ranges used were respectively 150° C. to 152° C. and 145° C. to 151° C. The beta-pinene polymer solution treated in those runs exhibited a retention of chlorine sufficient to give a positive indication by the Beilstein test. It has been established by these and other runs that the polymer solution should be zinc-treated at a temperature approximately as was straight-distilled in contact with the mossy zinc and 3% its weight of fuller's earth. The polymer solution was prepared as in run $b$ of Table 3, using "Solvesso" as the diluent and using 5% of aluminum chloride. Distillation was begun at a temperature of 170° C. and the rate of heating was cut back to take over 1 drop of distillate every 5 seconds for a total treating period of 2 hours. Throughout the distillation mechanical agitation was used to keep the fuller's earth in suspension and maintain good contact of the solution therewith during contact of the solution with the metallic zinc. In run $b$ of Table 7 the polymer solution was prepared as in run $c$ of Table 3, using petroleum naphtha as diluent and using 5% of aluminum chloride. Distillation was begun at 164° C. and when 172°

C. was reached the rate of heating was cut back to take over 1 drop every 5 seconds for a total treating period of 2 hours.

*Table 7—Dechlorination data*

| | Weight of Sample | Fuller's earth | Reaction Temperature | Beilstein Chlorine test on Resin solution |
|---|---|---|---|---|
| | | Grams | °C. | |
| a | 1,236 g. | 37 | 170–174 | Negative. |
| b | 1,000 g. poly'd. oil + 400 cc. Kerosene | 30 | 172–174 | Do. |

*Table 8—Distillation data*

| | Distillation Vessel | Weight of Sample Distilled | S. P. of Resin | Total Acidity of Distillate, cc. of N/10 NaOH | Color of Resin | Beilstein Chlorine test on Resin solution |
|---|---|---|---|---|---|---|
| | | Grams | °C. | Cc. | | |
| a | Glass | 500 | 113 | 2 | 5 | Negative. |
| | Iron | 533 | 113 | 16 | | Do. |
| b | Glass | 500 | 116 | 7 | 4 | Do. |

In all the dechlorination procedure described in Examples 1, 2 and 3 the softening point of the resin recovered by distillation was substantially lower than the resin recovered from samples of the same polymer solutions which had not been subjected to dehalogenation. The yield of resin was, however, higher and by continued steam distillation the softening point of the resin was raised to give a compensated result involving some sacrifice in both softening point and yield as compared with like properties of the resins recovered from identical undechlorinated polymer solutions. When dechlorination was conducted in an iron vessel either with or without reflux during distillation, it was found that the presence of the zinc prevented any destructive effect on the vessel in which the distillation was conducted. The resin was in every instance free from specks, and when the fuller's earth was present during the dechlorination contact the color was as good as if no zinc had been present. It may be stated therefore that contact of the polymer solution with zinc results in the reduction of the chlorine content of the polymer solution to a point at which the presence of chlorine is not indicated by the Beilstein test and the simultaneous presence of fuller's earth prevents discoloration of the terpene resin.

In order to establish that the procedure described above is equally effective in producing terpene resins other than a terpene resin composed of the polymers of beta-pinene, which resins are clear, light-colored, free from specks and free from any appreciable chlorine contamination, the procedure of the following examples was practiced.

EXAMPLE 4

A blend was made comprising 315 gm. of dipentene, distilling within the range of 169° C. to 179° C. (vapor temperature) and consisting chiefly of dl-limonene and 385 gm. of refined petroleum naphtha distilling within the range of 156° C. to 178° C. (vapor temperature). This blend was polymerized with 15.7 gm. (5% the weight of the dipentene) of aluminum chloride at a temperature within the range of 40° C. to 45° C. At the end of a two hour polymerization period the polymer solution was thinned with an additional 100 gm. of the refined petroleum naphtha and then was drowned with 15 cc. of concentrated hydrochloric acid and 125 cc. of water. The solution was then given two water washes of 50 cc. each.

The polymer solution was then divided into two parts, a 200 gm. portion and a 600 gm. portion. The 200 gm. portion was distilled without dechlorination in glass and a 72.5% yield of resin having a 118° C. (ball and ring) softening point was obtained. This resin showed a strong positive reaction for the presence of chlorine by the Beilstein copper wire test.

The 600 gm. portion was subjected to reflux distillation in the apparatus described in Example 3, 50 gm. of mossy zinc and 8 gm. of fuller's earth being used. The charge was refluxed at 175° C. with mechanical agitation for one hour and then was subjected to live steam for one-half hour at a temperature between 170° C. and 174° C. The total acidity taken off during dechlorination was determined in the manner described in connection with Example 3 was equivalent to 468 cc. of N/10 NaOH. The dechlorinated polymer solution was filtered and then was distilled for the recovery of solid resin, one-half in glass and one-half in an iron vessel. By distillation there was recovered a 78% total yield of resin having a ball and ring softening point of 106° C. This resin was chlorine-free, as indicated by the copper wire test and the portion of it which was distilled in an iron vessel was free from specks. It was between color G–4 and color G–5.

EXAMPLE 5

In this example the starting material was a mixture of 400 cc. (340 gm.) of sulphate turpentine distilling over 90% within the range of 151° C. to 178° C. (vapor temperature) and consisting of about 60% alpha-pinene, 25% beta-pinene and about 10% dipentine and 450 cc. of toluol. This starting mixture was agitated in a vessel equipped for heat abstraction, and 25 gm. of aluminum chloride was added in small increments during the course of an hour and was brought by agitation into reactive contact with the terpenes of the starting mixture. When all the aluminum chloride had been added, agitation was continued for about three hours to complete polymerization and throughout polymerization the temperature was held within the range of 40° C. to 45° C.

The polymer solution was then divided into two portions of about 420 cc. each. One portion was distilled without dechlorination in glass and a 65% yield of resin having a softening point of 90° C. (ball and ring) was obtained. This resin had a color G-5 and was strongly positive to the presence of chlorine by the Beilstein test.

The other portion of the polymer solution was subjected to reflux distillation in the apparatus described in Example 3 with 50 gm. of mossy zinc and 10 gm. of fuller's earth. The charge was refluxed at 175° C. with mechanical agitation for one hour and then was subjected to live steam for one-half hour at a temperature between 170° C. and 174° C. The polymer solution was filtered and then was distilled for the recovery of the solid resin. One-half of the dechlorinated polymer solution was distilled in glass and one-half in an iron vessel. By distillation there was recovered a 60% yield of resin having a softening point of 86° C. (ball and ring). All this resin was chlorine-free as indicated by the Beilstein test and the portion distilled in an iron vessel was free from specks. The resin was clear and had a color G-5.

The foregoing presents a simple and effective method for freeing from chlorine the polymer solutions obtained by the polymerization of terpene starting material with aluminum chloride catalyst. Throughout the above discussion and exemplification the use of fuller's earth has been made an element of the described process. This is for the reason that contact with fuller's earth during contact of the terpene polymer solution with the metallic zinc is necessary in order to recover a commercially acceptable resin. The actual dechlorination is performed by contact with zinc in metallic state. The fuller's earth functions not only generally to improve color but also functions more specifically to prevent increase in color depth by contact with zinc during the dechlorination operation. Insofar as the form of the metallic zinc is concerned, the exact form of the zinc is unimportant in causing the dehalogenation of the polymer solution. It is, of course, desirable that the metallic zinc be in such form that it presents a large contact area to the solution undergoing treatment. Of the zinc dust and mossy zinc the use of which has been described above, the mossy zinc is preferred for the reason that it tends less to cause a surge at the beginning of the treatment. As to the quantity of zinc, that is related to too many factors to be susceptible of exact definition, as for example to the duration and temperature of the treatment, to the mechanics of the treatment and to the form of the metallic zinc. It can be stated, however, that the zinc should be present in such quantity and form as to bring approximately the total body of the polymer solution into contact with it during the treatment.

Throughout the foregoing specification and in the claims where distillation temperatures are given without qualification, and particularly with respect to temperature ranges employed in polymerization and in distillation with or without reflux, the stated temperatures are to be taken as pot temperatures. Where parts are given without qualification they are to be understood to be parts by weight. Where softening point is given without qualification it is to be understood as determined by the ball and ring method A. S. T. M. E28-42T. In any place in which aluminum chloride is mentioned without qualification the catalyst is to be assumed to be anhydrous. In any place in which the term "fuller's earth" is used the material so designated is to be taken as a fuller's earth which has not been acid treated substantially to increase its acidity. In any place in which the color of the resins are given, those colors were determined in accordance with the procedure of Gardner Standards—1933 and not in the Gardner-Holdt color scale.

I claim as my invention:

1. The method of recovering light colored terpene resin free from included specks and chlorine contamination from a solution of hard terpene resin polymers formed by the catalytic action of aluminum chloride on a terpene starting liquid, which comprises treating the said solution by simultaneous contact thereof with zinc and with fuller's earth at a temperature within the approximate range of 160° C. to 180° C., removing acidic compounds from the said polymer solution, filtering the polymer solution so treated, and distilling the filtrate so obtained for the recovery of hard terpene resin polymers therefrom.

2. The method of recovering light colored beta-pinene resin free from included specks and chlorine contamination from a solution of hard beta-pinene resin polymers formed by the catalytic action of aluminum chloride on a beta-pinene starting liquid, which comprises treating the said solution by simultaneous contact thereof with zinc and with fuller's earth at a temperature within the approximate range of 160° C. to 180° C., removing acidic compounds from the said polymer solution, filtering the polymer solution so treated, and distilling the filtrate so obtained for recovery of hard beta-pinene resin polymers therefrom.

EDWARD W. SUHANIN.

REFERENCES CITED

The following references are of record in the file of this patent:

UNITED STATES PATENTS

| Number | Name | Date |
|---|---|---|
| 2,060,404 | Thomas et al. | Nov. 10, 1936 |
| 2,349,210 | Traylor | May 16, 1944 |